(12) United States Patent
Dagley et al.

(10) Patent No.: US 6,262,373 B1
(45) Date of Patent: Jul. 17, 2001

(54) CABLE STRAIN RELIEF BRACKET

(75) Inventors: Mark R. Dagley, N. Richland Hills; Billy E. Buller, Jr., Azle; John David Harvey, Trophy Club, all of TX (US)

(73) Assignee: Siecor Operations, LLC, Hickory, NC (US)

( * ) Notice: Subject to any disclaimer, the term of this patent is extended or adjusted under 35 U.S.C. 154(b) by 0 days.

(21) Appl. No.: 09/326,352

(22) Filed: Jun. 4, 1999

(51) Int. Cl.[7] .................................................. H02G 15/064
(52) U.S. Cl. ....................... 174/73.1; 174/135; 174/140 R
(58) Field of Search ..................................... 174/65 R, 72 C, 174/73.1, 135, 140 R, 151, 153 R, 164, 166 R, 168, 170

(56) References Cited

U.S. PATENT DOCUMENTS

| | | | |
|---|---|---|---|
| 5,821,458 | * 10/1998 | Wenzel | 174/65 R |
| 5,918,837 | * 7/1999 | Vicain | 174/135 |
| 6,013,875 | * 1/2000 | Fridenberg et al. | 174/65 R |
| 6,073,890 | * 6/2000 | Daoud | 174/153 R |
| 6,080,010 | * 6/2000 | Daoud | 174/135 |

* cited by examiner

Primary Examiner—Jeffrey Sterrett

(57) ABSTRACT

A strain relief bracket for use in conventional and modular furniture applications guards against excessive bending of copper and fiber optic cable. The device is a substantially rigid durable bracket that has an adhesive surface for adhesion to the interior of a furniture wall. The device is bi-planar, having a first section in a first plane, a raised flange section in a second plane, and a second section connecting the first section and raised flange section. A flange at the end of the first section secures the bracket to the edge of an opening in the furniture wall. Cables are secured to the bracket by cable ties that extend through holes provided on the raised flange section. The bi-planar arrangement of the bracket minimizes the bend radius of the cables and thereby strain relieves the cable, adapters, and connectors in the wall.

33 Claims, 2 Drawing Sheets

CABLE STRAIN RELIEF BRACKET

BACKGROUND OF THE INVENTION

1. Field of the Invention

The invention relates generally to cable strain relief brackets. More particularly, the present invention relates to cable strain relief brackets for use with conventional and modular furniture walls.

2. Description of the Prior Art

With the modernization of the office, small partitioned spaces, using modular furniture or cubicles, have become an efficient means to maximize office space and employee production. Cubicles may be arbitrarily set up and removed depending on the needs of the office. The modular furniture walls that comprise boundaries of the cubicle typically have port openings that allow for connection for items utilizing copper wire and/or optical fibers. These port openings receive cables that extend between the walls of the panels. Typically, a connector mounts over each port opening allowing for connection with the cables.

Such portability of the office walls and the associated office equipment is not without drawbacks. When cables protruding through openings of the furniture walls are routed to other furniture or appliances, strain may be imparted to the wires, adapters, and connectors. Among other reasons, this strain results from the movement of the furniture in relation to the static furniture wall or office equipment. Another drawback arises when one modular furniture wall is moved in relation to the other walls, which causes similar bending strain in the cables, adapters, connectors, and jacks. Without some type of strain relief to eliminate the strain at important points, the bending may cause degradation of the signal or, ultimately, complete failure of the signal. Irreparable damage to the cables, adapters, connectors, and jacks may also result.

The advent of optical fiber cable in offices further compounds the strain problem in conventional and modular furniture systems. The sensitivity of optical fibers to excessive bending parlays the importance of a strain relief device in environments that may subject the cables to increased stresses. Optical fiber cables are particularly sensitive to bending due to the possibility of micro-breaks or complete breaks in the fiber, thereby degrading or disrupting the signal. Cables must not violate a critical bending radius to prevent such damage to the fibers.

These problems are also present in conventional or stationary walls. Such conventional furniture walls now require retrofitting with modern strain relief devices for the relatively new fiber optic cable and, in even in some cases, conventional copper cables. However, there are no known strain relief devices that are easy to use, are easily secured to the cables and mounted to the walls, while providing adequate strain relief for the cables, especially fiber optic cables.

SUMMARY OF THE INVENTION

The present invention introduces a new apparatus and method for installing a strain relief device in conventional and modular furniture walls. The strain relief apparatus of the present invention comprises a bracket adapted to fit inside conventional and modular furniture walls adjacent to the opening where the cable and cable connections are located. The bracket adheres to the inside of the furniture wall and clamps to the opening to prevent movement between the cables and furniture wall or a wall plate that houses connectors or jacks. Cables extending inside the furniture wall to the opening are secured to the strain relief bracket via tie or cable wraps. The strain relief bracket is elongated with a low profile to maintain minimum bend radius from the point of cable sheath retention to the point of termination. Round and U-shaped holes are equally spaced on the offset of the strain relief bracket for securing the tie wraps to the strain relief bracket.

The strain relief bracket preferably has three sections. The first section nearest the opening has an end flange adapted to be attached to the edge of a wall opening. The flange of the bracket may then be crimped and secured to the edge by using pliers or other such tools that perform the same function. One side of the first section is securable to the inside of the furniture wall. The bracket may be attached by using double-sided tape, but may also include hook-and-loop such as Velcro™, glue, or any other adhesion means readily apparent in the art, including as a nut-and-bolt connection. The adhesion of the device to the furniture wall increases the shear force required to break loose the assembly when the cables are pulled from any direction, thereby relieving the strain on the connectors at the end of the cables.

The second or offset section of the strain relief bracket is preferably in a second plane relative to the first section and spaced away from the inside of the wall when the strain relief is attached to the wall. The first and second planes may or may not be parallel to one another. Round and U-shaped holes are spaced on the offset section for receiving the tie wraps, cable wraps, or other fasteners. Thus, the cables extend from an opening in the wall and transverse to the first section. At the second section, the cables are secured by tie wraps or other fasteners to the holes, such that strain is directed away from the connectors and adapters. The second section of the bracket also secures the cables a constant distance from the port opening, thereby preventing bending of the cables at or near the connectors in the opening. The second section may also serve the function of separating groups of cables and preventing entanglement when the terminating ends of the cables are moved relative to the port opening.

In the preferred embodiment, the third or transition section extends between the first and offset section at a slope away from the first section and inner wall of the furniture. This slope provides an area between the wall and the strain relief device for the tie wraps or other fasteners to be used without having to remove the device from the wall, once installed. It can be readily determined that the angle of the slope of the transition section is not critical to the function of the offset section. The slope of the transition section may be abrupt, such as 90°, causing the bracket to have more of a Z-shape, or the transition section may have a gradual slope, providing more of an S-shape. The function of the transition section will be served as long as the first section and offset section are maintained a constant distance from the cable connectors or adapters.

In a method for installing a strain relief bracket, a wall plate is removed from the furniture wall panel, or, if appropriate, a hole is made in the wall. The length of excess cable to reach from the tie wraps at the second (offset) section to a termination point at the connector or wall plate is determined. The end of the cable is then connectorized for connection with the connector plate. The cable is next secured to the offset section of the strain relief bracket by tie wraps or cable wraps. Double-sided tape or other such adhesion means as hook-and-loop or glue is applied to the inside of the strain relief bracket. The strain relief bracket is then hooked around the edge of the port opening and pressed against the inside of the furniture wall panel for securement thereto. The end of the first section of the strain relief bracket is then clamped around the edge of the port opening using pliers or other such clamping devices. The connectorized cable is connected to the connector plate and finally plugged into the wall.

This invention, although disclosed for conventional and modular furniture wall arrangements, may be used with other applications that have apertures for receiving cables from an external source and require strain relief for such cables and connectors.

BRIEF DESCRIPTION OF THE DRAWINGS

The accompanying drawings, which are incorporated in and constitute a part of this specification, illustrate an embodiment of the invention and, together with the description, serve to explain the principles of the invention.

DETAILED DESCRIPTION OF THE INVENTION

Figure 1:
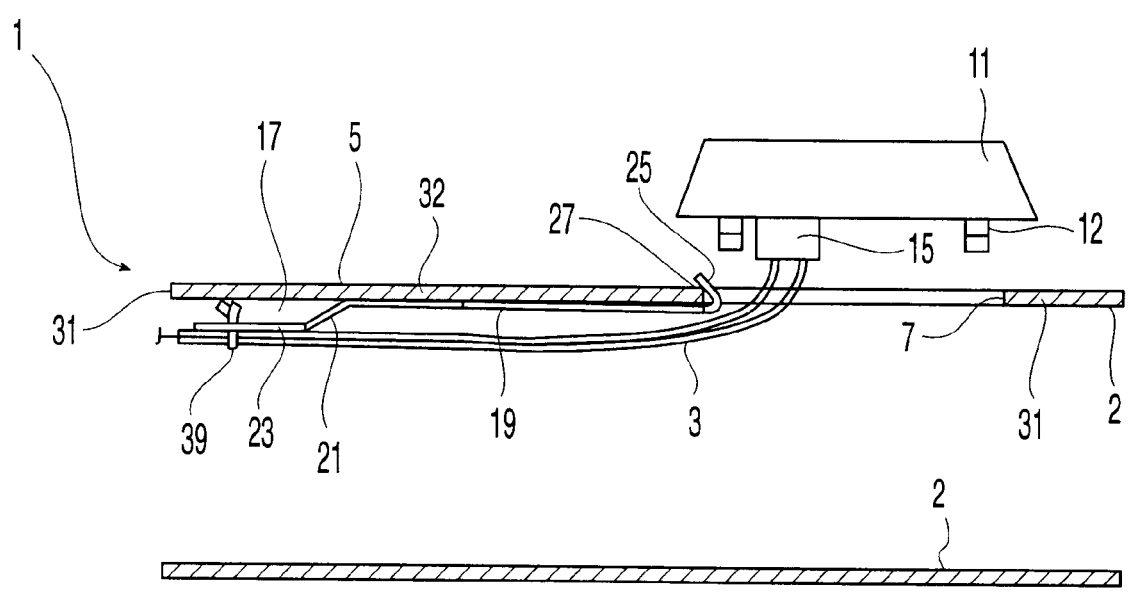
FIG. 1 is a top cross-section of a furniture wall showing a strain relief bracket constructed in accordance with the invention adhered to the inside of the furniture wall and clamped to the opening.

FIG. 1 is a cross-section of wall 1, which may be either a conventional, stationary wall or a modular furniture wall, having two panels 2 (with a conventional wall, the panels would be gypsum board) spaced apart, allowing cables 3 to pass therebetween. Cables 3 may be either optical fibers, fiber optic cables, or copper cables. The wall 1 has an opening 7 on front side 5 to allow for access to cables 3, etc. The opening 7 may already be in the wall and covered with a flat wall plate (not shown) or the opening 7 may have to be cut into one of the panels 2. The ends of cables 3 need to then be able to connect with other cables or equipment at or near the opening 7. This connection usually requires connectors 15 or a connector sleeve that is mounted in connector plate 11, which usually covers opening 7. Strain relief bracket 17 is attached to cables 3 at one end and to the wall 1 at its other end to prevent the cables 3 from pulling directly on the connector 15 or the connector plate 11 and causing stress or a bend in the cables 3 if a force is applied to the cables 3.

Figure 2:
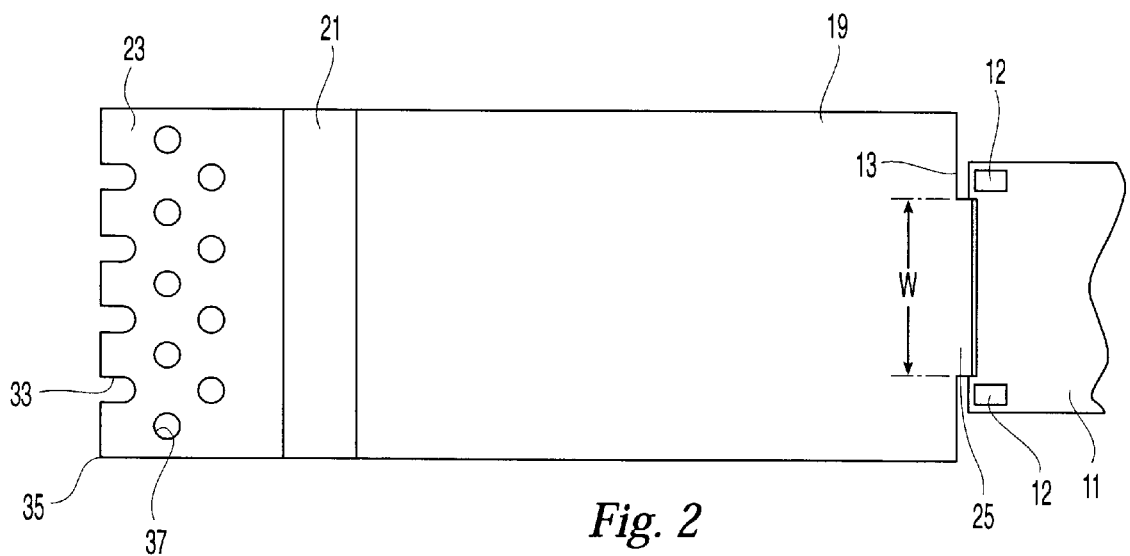
FIG. 2 is a top view of the strain relief bracket of FIG. 1 with a portion of a connector plate.
Figure 3:
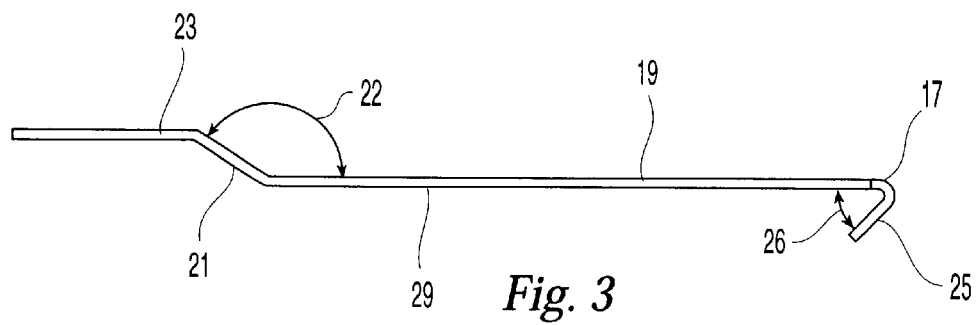
FIG. 3 is a side view of the strain relief bracket of FIG. 1.

As shown in FIGS. 2 and 3, strain relief bracket 17 preferably has three sections: a first section 19, a transitional section 21, and an offset section 23. First section 19 is preferably considerably longer than offset section 23. However, the three sections may be of any length relative to one another, so long as there is sufficient distance between the ends to prevent the bend radius from being violated. First section 19 also has an end flange 25 adapted to be hooked around edge 27 of wall opening 7. The end flange 25 may have a larger radius than that shown in the figures if the strain relief bracket 17 is to be used with a conventional wall. End flange 25 of strain relief bracket 17 may be crimped and secured to edge 27 of wall opening 7 by pliers or other such tools, not shown. End flange 25 is at an acute angle 26 relative to first section 19, as shown in FIG. 3, but may be at any angle relative to the first section 19 as long as a constant distance is maintained from cables 3 to the connector 15. First section 19 has adhesive side 29 for adherence to inside surface 31 of wall 1. In the preferred embodiment, adhesive side 29 comprises double-sided tape 32, or it may comprise a layer of glue or hook and loop material. Additionally, as shown in FIG. 2, the end flange 25 has width W that fits between the tabs 12 on the connector plate 11, and shoulders 13 extend beyond the tabs 12 and the edges of the plate 11. Such an arrangement prevents the strain relief bracket 17 and the end flange 25 from being pushed into the connector plate 11 and putting strain on the connector 15 or breaking the connection if the strain relief bracket 17 is dislodged from the wall toward the connector plate 11.

Offset section 23 of strain relief bracket 17 is spaced away from first section 19 in a second plane relative to first section 19. Offset section 23 has holes 37, which are spaced on offset section 23, to secure cables 3 to strain relief bracket 17. Offset section 23 also has spaced U-shaped openings 33 that are located at the terminal end 35 of offset section 23. The U-shaped openings 33 aid in securing the cables 3 to the strain relief bracket 17 once the bracket is installed within wall 1. Once installed in the wall, access to the underside of the bracket 17 is limited, making it difficult, if not impossible, to route the tie wrap 39 back through another hole from the underside of the bracket 17. Thus, a user can insert a tie wrap 39 through one of the holes 37, and route it around the end 35 to secure the cables 3, eliminating the need to access the underside of the bracket 17. By routing the tie wrap around the end 35, the user need not try to get the tie wrap 39 back through one of the holes 37, but route it through the U-shaped openings 33. The configuration of the U-shaped openings prevent the tie wrap from moving along the end of the bracket 17.

Transition section 21 preferably extends between first section 19 and offset section 23 at an angle 22 (FIG. 3) of approximately 150° away from first section 19 (and front side 5 of furniture wall 1 when attached). Transition section 21 preferably maintains first section 19 and offset section 23 in parallel planar relationship. However, first section 19 and offset section 23 need not be parallel, however, the angle of offset section 23 must be such that terminal end 35 does not become a sharp edge that can cause undesirable bending in the cables 3 at that end. While the pictured embodiment illustrates that the boundaries between each of the sections of strain relief bracket appear to define discreet sections, the boundaries could be more gradual. For example, the strain relief bracket 17 could appear more like the letter S than the letter Z, as illustrated.

In operation, the wall plate is removed from front side 5 of wall 1 or a hole is cut in the wall 1. Cables 3 are then fed inside the furniture wall 1, if not already present. The flange 25 of the strain relief bracket 17 is then attached to the edge 27 of the wall opening 7 and the first section 19 of bracket 17 is adhered to the inside surface 31 of the wall 1. Cables 3 are then secured to offset section 23 of strain relief bracket 17 by tie wraps 39. The cables 3 are then connectorized with connectors 15 for engagement with connector plate 11. The connector plate 11 is then inserted into the opening 7.

Alternatively, the cables 3 in the wall 1 could first be secured to offset section 23 of strain relief bracket 17 by tie wraps 39. The cables 3 will be secured at point that allows for a length of cable that is slightly longer than the distance from where they are secured to the connector 15. This allows for some "play" in the cable to prevent imparting strain on the connectors. Bracket 17 is then hooked to edge 27 of wall opening 7 and adhered to inside surface 31 of wall 1. The cables 3 are then connectorized. Connector 15 is secured in a sleeve in connector plate 11 (or the sleeve may be integral with the plate), which in turn snaps into wall opening 7, thereby providing external access for connection with cable 3. The bi-planar relationship of bracket 17 prevents bending of cables 3 extending from connector or adapter 15 and also protects connector 15.

Bracket 17 may have varying sizes of end flange 25 relative to body of bracket 17. The size of the bracket 17 and end flange 25 will change depending on the application. An alternative embodiment of the present invention comprises a reduction in the overall width of strain relief bracket to a matching width of clamping flange of the connector plate 11.

While the invention is susceptible to various modifications and alternative forms, preferred embodiments thereof have been shown by way of example in the drawings and are herein described in detail. It should be understood, however, that the description herein of specific embodiments is not intended to limit the invention to the particular forms disclosed; but on the contrary, the intention is to cover all modifications, equivalents, and alternatives falling within the spirit and scope of the invention as defined by the appended claims.

What is claimed is:

1. A strain relief bracket for protecting cable passing through a wall comprising:
   a substantially rigid first section in a first plane;
   a flange disposed at a first end of said first section for engaging said bracket with an aperture in the wall; and
   a substantially rigid offset section joined to the first section and in a second plane, the offset section being adapted to retain a cable secured thereto.

2. The strain relief bracket of claim 1 further comprising a transition section joining said first section and said offset section.

3. The strain relief bracket according to claim 1, wherein said offset section has a plurality of holes for receiving a cable fastener and anchoring the cable thereto.

4. The strain relief bracket according to claim 3, wherein a portion of the plurality of holes are U-shaped and are disposed at an end of the offset section.

5. The strain relief bracket according to claim 3, wherein the cable fastener is a tie wrap.

6. The strain relief bracket according to claim 1, wherein the first section and the offset section each have a length, and the length of the first section is different than the length of the offset section.

7. The strain relief bracket according to claim 1, wherein said first and second planes are parallel.

8. The strain relief bracket according to claim 1, wherein said flange is at an acute angle relative to said first section.

9. The strain relief bracket according to claim 1, wherein said first section has an adhesive for adhering to the wall.

10. The strain relief bracket according to claim 9, wherein said adhesive comprises double-sided tape.

11. The strain relief bracket according to claim 9, wherein said adhesive comprises glue.

12. The strain relief bracket according to claim 9, wherein said adhesive comprises hook-and-loop material.

13. In a wall having first and second parallel panels spaced apart, an aperture in the first panel having an edge, a cable connector mounted to the first panel over the aperture, and a cable located between the panels and coupled to the connector, the improvement being a strain relief bracket comprising:
   a substantially rigid first section;
   a flange disposed at a first end of said first section, the flange being hooked over the edge of the aperture;
   said first section having a first side secured in abutment to an inside surface of the first panel; and
   a substantially rigid offset section spaced from the inside surface of the first panel, wherein the cable is secured to the offset section.

14. The strain relief bracket according to claim 13, further comprising a transition section between said first section and said offset section.

15. The wall of claim 14, wherein said transition section is at a predetermined angle relative to said first section and said offset section.

16. The wall of claim 14, wherein said transition section is substantially rigid.

17. The wall of claim 13, wherein said flange is at an acute angle relative to said first section.

18. The wall of claim 13, wherein said offset section has a plurality of holes for receiving a cable fastener and anchoring the cable thereto.

19. The wall of claim 18, wherein the cable fastener is a tie wrap.

20. The wall of claim 13, wherein said offset section includes a plurality of U-shaped holes for receiving a cable fastener and anchoring the cable thereto.

21. The wall of claim 13, wherein said first section and section offset section are parallel.

22. The wall of claim 13, wherein the cable is fiber optic cable.

23. The wall of claim 13, wherein the first section and the offset section each have a length, and the length of the first section is different than the length of the offset section.

24. The wall of claim 13, wherein an adhesive secures said first section in abutment to the inside surface of the first panel.

25. The wall of claim 24, wherein the adhesive comprises double-sided tape.

26. The wall of claim 24, wherein the adhesive comprises glue.

27. The wall of claim 24, wherein the adhesive comprises hook-and-loop material.

28. A method of providing a cable outlet in a wall having first and second spaced apart panels, and a cable therebetween, comprising the steps of:
   providing an aperture in the first panel;
   providing a bracket having a flange at a first end of the bracket;
   hooking the flange around an edge of the aperture;
   securing the bracket to the inside surface of the first panel;
   securing the cable to the bracket;
   attaching the cable to a connector plate; and
   securing the connector plate over the aperture.

29. The method of claim 28, further comprising the step of clamping the flange to the edge of the aperture.

30. The method of claim 28, wherein the step of attaching the cable to a connector plate includes the steps of:
   connectorizing the cable to a fiber optic connector; and
   inserting the connector into the connector plate.

31. The method of claim 28 wherein the step of securing the bracket comprises placing an adhesive into contact with the inside surface of the first panel.

32. The method of claim 28 wherein the step of securing the cable to the bracket comprises placing a cable tie around the cable and securing the cable tie to the bracket.

33. The method of claim 28 wherein the step of hooking the flange comprises compressing the flange securely around the edge of the aperture.

* * * * *